United States Patent
Nakao et al.

(12)

(10) Patent No.: US 11,117,216 B2
(45) Date of Patent: Sep. 14, 2021

(54) LASER JOINING METHOD FOR GALVANIZED STEEL SHEETS

(71) Applicant: HONDA MOTOR CO., LTD., Tokyo (JP)

(72) Inventors: Keiichiro Nakao, Tochigi (JP); Koji Nishimoto, Tokushima (JP)

(73) Assignee: Honda Motor Co., Ltd., Tokyo (JP)

( * ) Notice: Subject to any disclaimer, the term of this patent is extended or adjusted under 35 U.S.C. 154(b) by 515 days.

(21) Appl. No.: 15/805,614

(22) Filed: Nov. 7, 2017

(65) Prior Publication Data

US 2018/0126492 A1     May 10, 2018

(30) Foreign Application Priority Data

Nov. 8, 2016    (JP) .............................. JP2016-218347

(51) Int. Cl.
*B23K 26/26*        (2014.01)
*B23K 26/02*        (2014.01)
(Continued)

(52) U.S. Cl.
CPC .......... *B23K 26/26* (2013.01); *B23K 26/0093* (2013.01); *B23K 26/0846* (2013.01);
(Continued)

(58) Field of Classification Search
CPC .............. B23K 26/0093; B23K 26/037; B23K 26/0846; B23K 26/24; B23K 26/244;
(Continued)

(56) References Cited

U.S. PATENT DOCUMENTS 3,860,784 A * 1/1975 Brown ............... B23K 26/0643
219/121.64
4,185,185 A * 1/1980 Adlam ................... B23K 26/08
219/121.64
(Continued)

FOREIGN PATENT DOCUMENTS

CA            1085464 A     9/1980
CN          105149789 A    12/2015
(Continued)

OTHER PUBLICATIONS

Office Action issued in the corresponding Chinese Patent Application No. 201711094399.4 with the English translation thereof and dated Mar. 21, 2019.
(Continued)

*Primary Examiner* — Justin C Dodson
(74) *Attorney, Agent, or Firm* — Carrier Blackman & Associates, P.C.; William D. Blackman; Joseph P. Carrier (57) ABSTRACT

The laser irradiation step includes: removing zinc plating layers respectively disposed on the surfaces of the galvanized steel sheets by the laser irradiation; and melting the surfaces of the galvanized steel sheets of which the zinc plating layers have been removed, and the roller pressurizing step includes pressurizing the galvanized steel sheets by the rollers while the surfaces of the galvanized steel sheets that have been melted are in contact with each other such that the galvanized steel sheets are joined together.

6 Claims, 5 Drawing Sheets

(51) Int. Cl.
*B23K 26/00* (2014.01)
*B23K 26/08* (2014.01)
*B23K 26/244* (2014.01)
*B23K 26/322* (2014.01)
*B23K 28/02* (2014.01)
*B23K 101/34* (2006.01)

(52) U.S. Cl.
CPC .......... B23K 26/244 (2015.10); B23K 26/322 (2013.01); B23K 28/02 (2013.01); *B23K 2101/34* (2018.08)

(58) Field of Classification Search
CPC ...... B23K 26/26; B23K 26/32; B23K 26/322; B23K 28/02
USPC .......................................... 219/121.6–121.66
See application file for complete search history.

(56) References Cited

U.S. PATENT DOCUMENTS 4,500,771 A * 2/1985 Miller ................ B23K 26/0846
219/121.68
4,560,855 A * 12/1985 Takafuji ................. B23K 20/04
219/121.64
2011/0168682 A1* 7/2011 Hagihara ............. B23K 26/244
219/121.64
2011/0266263 A1* 11/2011 Hagihara ............. B23K 26/244
219/121.64

FOREIGN PATENT DOCUMENTS

| DE | 101 35 611 A1 | 2/2003 |
| DE | 10 2008 006 624 A1 | 7/2009 |
| JP | S61-193792 A | 8/1986 |
| JP | S63-063586 A | 3/1988 |
| JP | 2009-107158 A | 5/2009 |
| JP | 2001-115836 A | 6/2011 |

OTHER PUBLICATIONS

Combined Search and Examination Report issued to corresponding GB Patent Application 1718466.4 dated Jan. 9, 2018.

* cited by examiner

LASER JOINING METHOD FOR GALVANIZED STEEL SHEETS

CROSS-REFERENCE TO RELATED APPLICATIONS

This application is based on and claims the benefit of priority from Japanese Patent Application No. 2016-218347, filed on 8 Nov. 2016, the content of which is incorporated herein by reference.

BACKGROUND OF THE INVENTION

Field of the Invention

The present invention relates to a laser joining method for galvanized steel sheets.

Related Art

Conventionally, a laser joining method for steel sheets has been known. According to the method, for example, steel sheets are stacked to obtain mating surfaces, and the steel sheets are joined together by laser irradiation (For example, see Patent Document 1, Patent Document 2, and Patent Document 3). Also known is a method for joining galvanized steel sheets in which stacked galvanized steel sheets in a layered manner are irradiated with a laser beam emitted in the stacking direction (For example, see Patent Document 1 and Patent Document 3).

Patent Document 1: Japanese Unexamined Patent Application, Publication No. S61-193792
Patent Document 2: Japanese Unexamined Patent Application, Publication No. S63-63586
Patent Document 3: Japanese Unexamined Patent Application, Publication No. 2011-115836

In the case where layered galvanized steel sheets are joined by laser beam irradiation as disclosed in Patent Document 3, the steel sheets are required to be melted even at a part that does not contribute to the joining of the steel sheets, and thus more than the necessary energy for laser irradiation is wasted.

Specifically, the galvanized steel sheets are stacked in a layered manner and irradiated with a laser beam in the stacking direction to be joined together, and thus the upper one of the galvanized steel sheets that is disposed on the upstream side in the irradiating direction of the laser beam is melted until being penetrated by the laser beam. Then, the melted portion is joined with a melted portion of the other one of the galvanized steel sheets disposed on the downstream side in the irradiating direction of the laser beam. Although the galvanized steel sheets should be melted only at portions to be joined together, the energy for the laser irradiation is practically required to an extent that the upper one of the galvanized steel sheets disposed on the upstream side in the irradiation direction is melted until being penetrated by the laser beam as described above.

As described in the above Patent Document 3, when galvanized steel sheets are joined by laser irradiation, the zinc plating is vaporized by the laser irradiation and turns into vapor. As a result, the occurrence of a blowhole, which is a spherical cavity, cannot be sufficiently suppressed at a joining portion of the steel sheets. In addition, it is difficult to reliably suppress a situation in which two stacked galvanized steel sheets are melted by laser irradiation and fall off forming a through hole penetrating in the stacking direction.

Patent Documents 1 and 2 do not describe zinc plating and do not disclose a measure to prevent the above described occurrence of a blowhole.

An object of the present invention is to provide a laser joining method for galvanized steel sheets capable of suppressing occurrence of a blowhole, suppressing occurrence of a through hole penetrating stacked galvanized steel sheets in the stacking direction, and also reducing the laser irradiation energy required for joining the galvanized steel sheets.

SUMMARY OF THE INVENTION

To achieve the above object, the present invention provides a laser joining method for galvanized steel sheets including: a laser irradiation step in which mating surfaces (such as mating surfaces A described below) of galvanized steel sheets (such as sheet members P described below) are subjected to laser irradiation such that the mating surfaces of the galvanized steel sheets are melted, the galvanized steel sheets respectively having surfaces coated with zinc; and a roller pressurizing step in which the galvanized steel sheets are pressurized by a roller (such as a pressure roller 20 described below) to join the sheets together, wherein the laser irradiation step includes: removing zinc plating layers (such as zinc plating layers PL described below) respectively disposed on the surfaces of the galvanized steel sheets by the laser irradiation; and melting the surfaces of the galvanized steel sheets of which the zinc plating layers have been removed, and the roller pressurizing step includes pressurizing the galvanized steel sheets by the roller while the surfaces of the galvanized steel sheets that have been melted are in contact with each other such that the galvanized steel sheets are joined together.

According to the present invention, the zinc plating layers are vaporized by the laser irradiation and the galvanized steel sheets are joined together while letting the vaporized zinc escape from the galvanized steel sheets, whereby occurrence of a blowhole can be suppressed. In addition, since only portions necessary for the joining are melted, the energy for the laser irradiation required for joining the galvanized steel sheets can be reduced. This eliminates the need for melting portions of the steel sheets unnecessary for the joining. This suppresses occurrence of a through hole penetrating the two stacked galvanized steel sheets in the stacking direction (a through hole formed by melting of the steel sheets).

In the laser irradiation step, a focal point (such as a focal point F described below) of a laser beam in the laser irradiation is set at a position directly in front of a position where the galvanized steel sheets are subjected to pressurizing. This configuration reliably suppresses occurrence of a blowhole, since the zinc plating layers are removed before the galvanized steel sheets are pressurized by the roller.

In the laser irradiation step, the zinc plating layers are removed from a first region (such as a first region R1 described below) of the galvanized steel sheets by the laser irradiation, and then steel members of the galvanized steel sheets in a second region (such as a second region R2 described below) are melted by the laser irradiation, the second region being disposed in the first region and being smaller than the first region. Accordingly, the zinc plating layers are widely removed, and the occurrence of blowholes can be more reliably suppressed.

The roller pressurizing step further includes covering the first region with the steel members of the galvanized steel sheets having been melted by the laser irradiation. Accordingly, the steel members fill the space generated between the joined two galvanized steel sheets by removing the zinc plating layers, thereby enhancing the bonding strength. In addition, intrusion of water, dust, and the like can be prevented by filling the space.

In the laser irradiation step, an output of laser irradiation is increased at a center part (such as a center part S described below) of a laser beam and lowered at a peripheral part (such as a peripheral part W) of the laser beam. Since an output of laser irradiation is lowered at a peripheral part of a laser beam, only zinc plating layers, a boiling point of which is low, are widely removed, and the surfaces of the steel members of which zinc plating layers have been removed are melted at a center part of the laser beam with a high output power.

The galvanized steel sheets having a difference in thickness are joined together. The galvanized steel sheets having a difference in thickness can be joined together.

An edge part (such as an edge part E described below) of one of the galvanized steel sheets (such as a second sheet member P22 described below) is joined to a surface of the other one of the galvanized steel sheets (such as a first sheet member P21 described below). With this configuration, the two galvanized steel sheets can be joined together, for example in a T-shape.

An aspect of the present invention provides a laser joining method for galvanized steel sheets capable of suppressing occurrence of blowholes, suppressing occurrence of through holes penetrating the stacked galvanized steel sheets in the stacking direction, and also reducing the energy required for laser irradiation for joining the galvanized steel sheets.

DETAILED DESCRIPTION OF THE INVENTION

Figure 1:
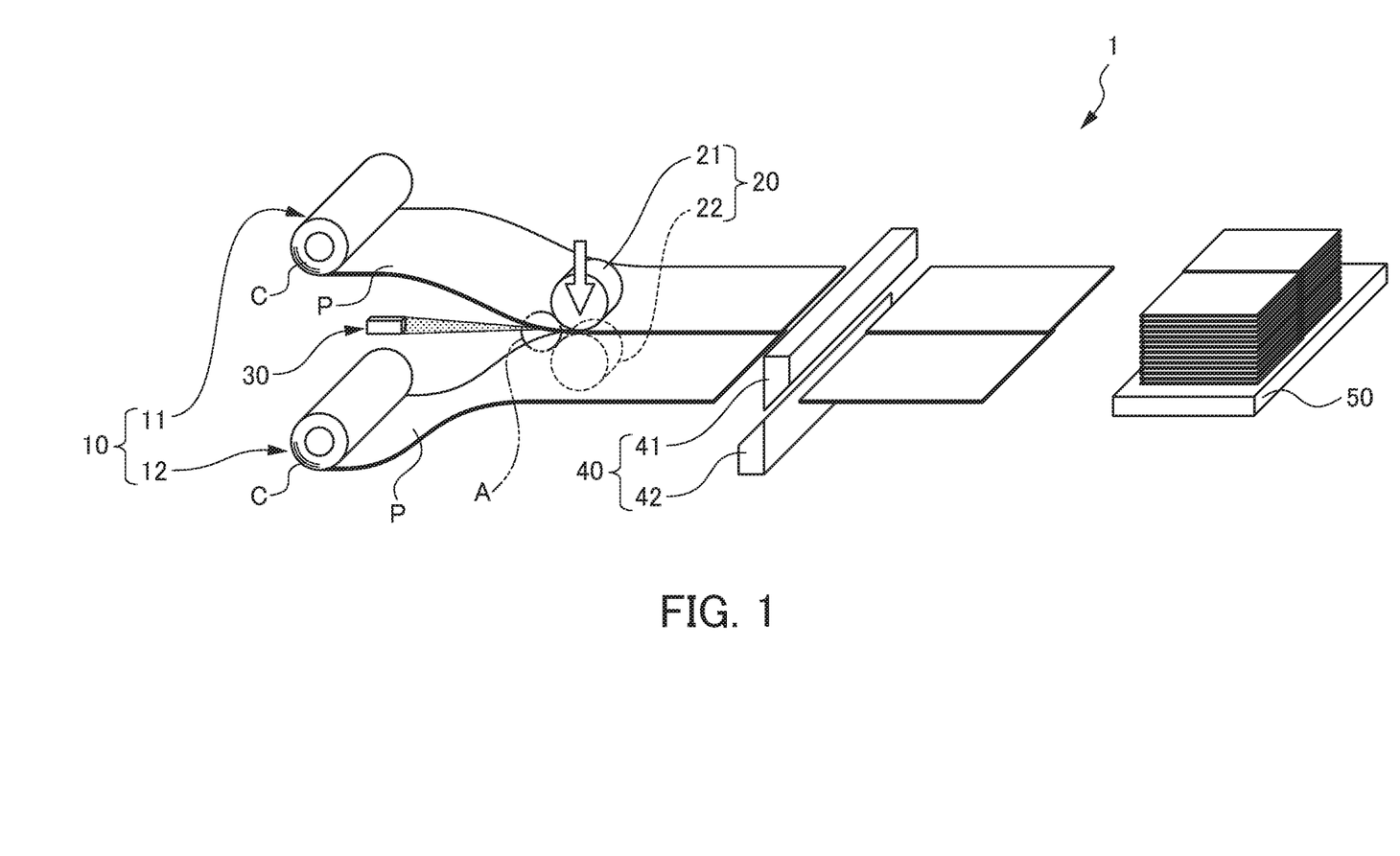
FIG. 1 schematically shows a laser joining device that performs a laser joining method for galvanized steel sheets according to a first embodiment of the present invention.
Figure 2:
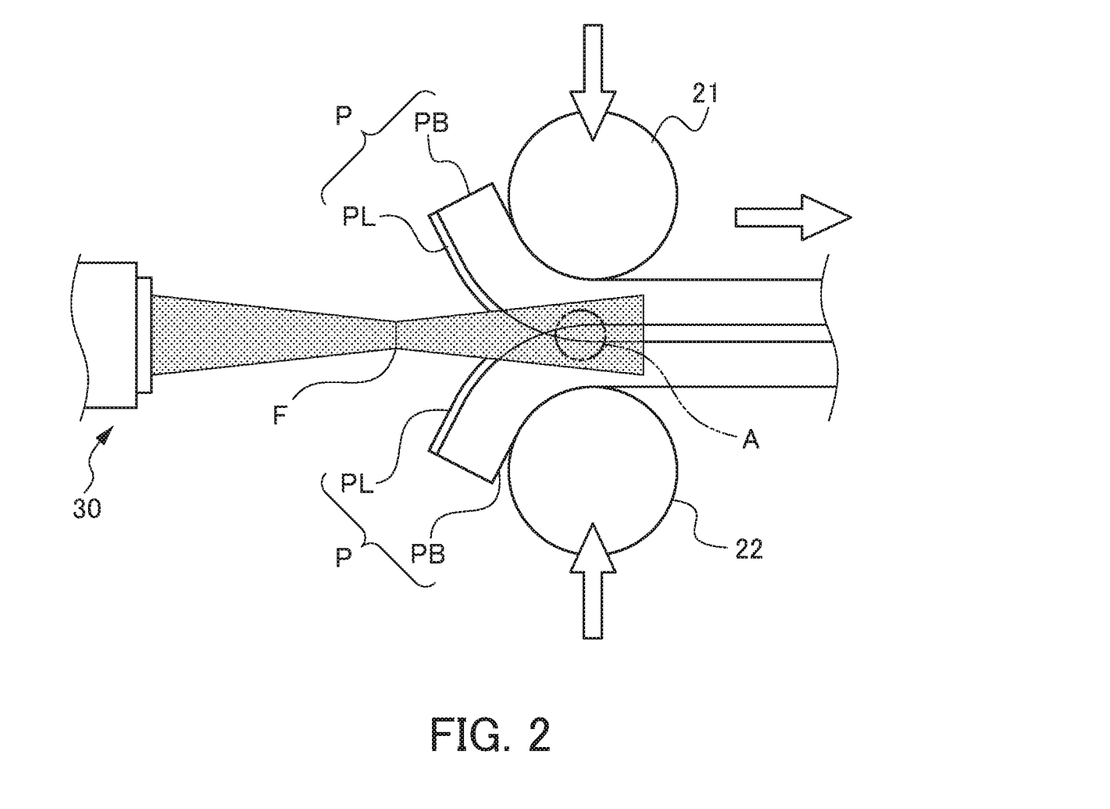
FIG. 2 schematically shows a state in which mating surfaces are irradiated with a laser beam in a laser irradiation step of the laser joining method for galvanized steel sheets according to the first embodiment of the present invention.
Figure 3A:
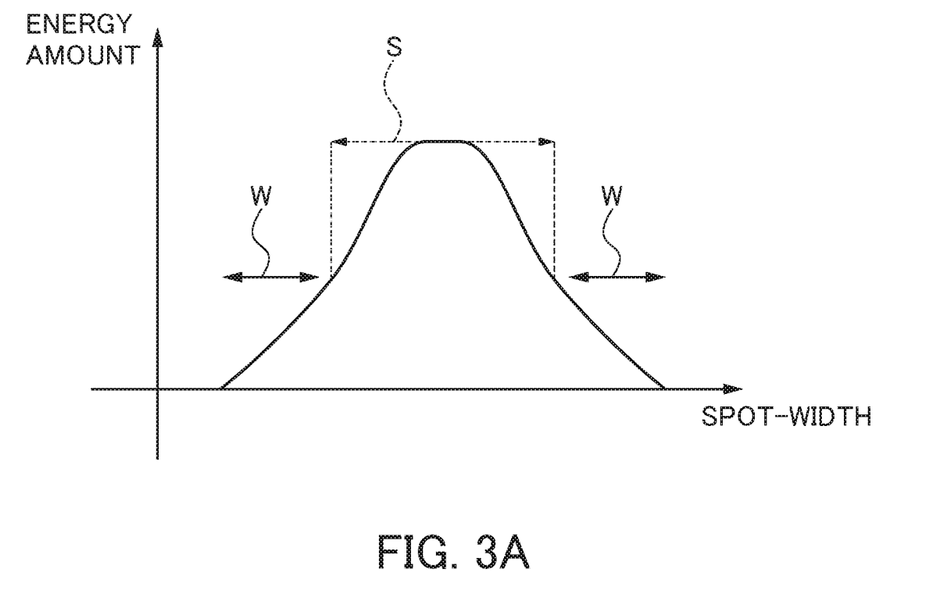
FIG. 3A is a graph showing the energy amount relative to the spot-width of the laser beam in the laser irradiation step of the laser joining method for galvanized steel sheets according to the first embodiment of the present invention.
Figure 3B:
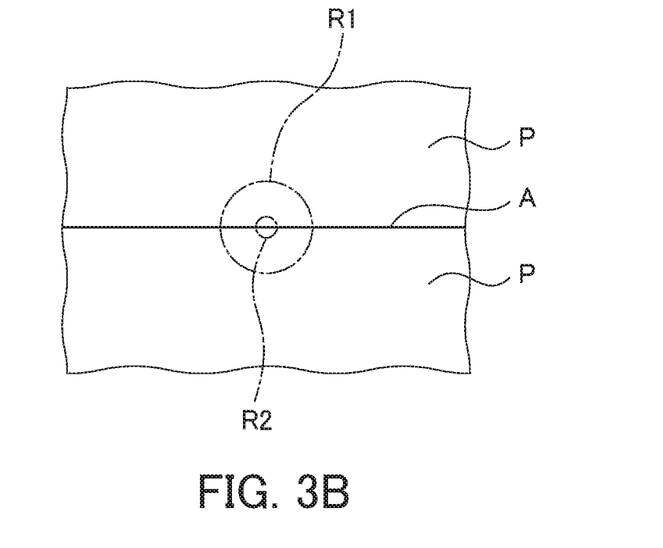
FIG. 3B schematically shows a first region and a second region that are irradiated with the laser beam in the laser irradiation step of the laser joining method for galvanized steel sheets according to the first embodiment of the present invention.

A first embodiment of the present invention will be described in detail with reference to the drawings. A laser joining method for galvanized steel sheets is implemented to fabricate an inner panel of a vehicle door by joining two galvanized steel sheets. FIG. 1 schematically shows a laser joining device 1 that performs the laser joining method for galvanized steel sheets according to the first embodiment of the present invention. FIG. 2 schematically shows a state in which mating surfaces A are irradiated with a laser beam in a laser irradiation step of the laser joining method for galvanized steel sheets according to the first embodiment of the present invention. FIG. 3A is a graph showing the energy amount relative to the spot-width of the laser beam in the laser irradiation step of the laser joining method for galvanized steel sheets according to the first embodiment of the present invention. FIG. 3B schematically shows a first region R1 and a second region R2 that are irradiated with the laser beam in the laser irradiation step of the laser joining method for galvanized steel sheets according to the first embodiment of the present invention.

First, the laser joining device 1 that performs the laser joining method for galvanized steel sheets will be described. As shown in FIG. 1, the laser joining device 1 includes an uncoiler 10, a guide roller (not shown), a pressure roller 20, a laser emitting unit 30, a shear cutting machine 40, and a stack table 50.

The uncoiler 10 includes a pair of uncoilers. The pair of uncoilers 11, 12 respectively feed sheet members P, i.e., coil members C respectively wound by galvanized steel sheets having the same thickness. The guide roller (not shown) flatly extends galvanized steel sheets that are the sheet members P having been fed from the respective uncoilers 11, 12 to remove curls of the galvanized steel sheets.

The pressure roller 20 includes a pair of rollers 21, 22 disposed adjacent to each other and having the same radius, and the rotation axis of each of the pair of rollers 21, 22 is arranged in a direction orthogonal to the direction in which the pair of uncoilers 11, 12 feed the galvanized steel sheets. In the pressure roller 20, the galvanized steel sheets (sheet members P), i.e., one from the uncoiler 11 and the other one from the uncoiler 12, are stacked together and pressurized between the pair of rollers 21, 22.

Specifically, one of the galvanized steel sheets (sheet members P) fed from the uncoiler 11 is introduced between the rollers 21, 22 along the peripheral surface of the upper roller 21, and the other galvanized steel sheet (sheet members P) fed from the uncoiler 12 is introduced between the rollers 21, 22 along the peripheral surface of the lower roller 22. With this configuration, the surface of one of the galvanized steel sheets (sheet members P) fed from the uncoiler 11 and the surface of the other galvanized steel sheet (sheet members P) fed from the uncoiler 12 come close to each other as the galvanized steel sheets (sheet members P) come closer to the rollers 21, 22, and then the galvanized steel sheets (sheet members P) are brought into contact with each other between the rollers 21, 22 to form mating surfaces A.

The laser emitting unit 30 irradiates the mating surfaces A formed by stacking the galvanized steel sheets (sheet members P) to mate the surfaces thereof with each other. More specifically, the laser emitting unit 30 is capable of emitting a laser beam toward the mating surfaces A where the surfaces of the galvanized steel sheets as the sheet members P come into contact with each other, the galvanized steel sheets having been fed from the pair of uncoilers 11, 12, respectively. The laser emitting unit 30 performs laser irradiation to remove zinc plating layers PL from the first region R1 (see FIG. 3B) disposed in the vicinity of the mating surfaces A of the galvanized steel sheets as the sheet members P which have been fed from the pair of uncoilers 11, 12 respectively, and to melt steel members PB of the galvanized steel sheets in the second region R2, which is disposed in the first region R1 having the zinc plating layers PL removed and is smaller than the first region R1. As shown in FIG. 3B, the first region R1 and the second region R2 respectively have circular shapes and have a coaxial relationship with each other. The second region R2 is positioned at the center of the first region R1.

Although a fiber laser is used as the laser beam, for example, the laser beam is not limited thereto, and a solid-state laser, a liquid laser, a gas laser, a semiconductor laser, a free electron laser, a metal-vapor laser, a chemical laser, an yttrium aluminum garnet (YAG) laser, a disk laser, a carbon dioxide gas laser, or the like may be used as the laser beam.

The shear cutting machine 40 includes an upper blade 41 and a lower blade 42, and simultaneously cuts out the two joined galvanized steel sheets with the shearing forces caused by the upper blade 41 and the lower blade 42. The pieces of the joined two galvanized steel sheets having been cut out by the shear cutting machine 40 are stacked on the stack table 50. Note that a laser beam may be used to cut out the galvanized steel sheets instead of the shear cutting machine 40.

Then, the laser joining method for galvanized steel sheets will be described below. The laser joining method for the galvanized steel sheets includes a laser irradiation step and a roller pressurizing step. In the laser irradiation step, the mating surfaces A of the galvanized steel sheets (sheet members P) of which the surfaces are coated with zinc are irradiated with a laser beam to melt the mating surfaces A of the galvanized steel sheets. Then, in the roller pressurizing step, the galvanized steel sheets are pressurized by the rollers 21, 22 to be joined together.

Specifically, a feeding step is firstly performed in which each of the uncoilers 11, 12 feeds one of the galvanized steel sheets as the sheet members P. The galvanized steel sheets having been fed are subjected to removing of curls by the guide roller (not shown), and are fed between the pair of rollers 21, 22 of the pressure roller 20.

Then, the laser irradiation step is performed. In the laser irradiation step, the zinc plating layers PL on the surfaces of the galvanized steel sheets are removed by laser irradiation, and the surfaces of the galvanized steel sheets from which the zinc plating layers PL have been removed (steel members PB) are melted. Specifically, a focal point F of a laser beam in the laser irradiation performed by the laser emitting unit 30 is set at a position directly in front of the position where the galvanized steel sheets are subjected to pressurizing. With this configuration, the output (energy) of the laser irradiation is increased at a center part S (see FIG. 3A) of a laser beam and is lowered at a peripheral part W of the laser beam, as shown in FIG. 3A.

As a result, the zinc plating layers PL in the first region R1 on the galvanized steel sheets (sheet members P) having been fed respectively from the pair of uncoilers 11, 12 are removed at the peripheral part W of the laser beam with a laser irradiation low output power. Then, the galvanized steel sheets (sheet members P) are respectively fed from the pair of uncoilers 11, 12 and the first region R1 on the galvanized steel sheets reaches the center part S of the laser beam where an output of the laser irradiation is increased, whereby the center part S of the laser beam melts the steel members PB of the galvanized steel sheets in the second region R2, which is disposed in the first region R1 and is smaller than the first region R1, to obtain molten steel members M. The above is the laser irradiation step.

Then, the roller pressurizing step is performed. In the roller pressurizing step, the galvanized steel sheets are joined together by pressurizing the steel sheets by the rollers 21, 22 while the melted surfaces of the galvanized steel sheets are in contact with each other. Specifically, two galvanized steel sheets (molten steel members M) are pressurized by the pair of rollers 21, 22, while the mating surfaces A in the second region R2 have been melted in the laser irradiation step. This causes the molten steel members M to flow out of the second region R2, so that the first region R1 and the peripheral area of the first region R1 are covered with the molten steel members M, whereby the two galvanized steel sheets are joined together at an area larger than the second region R2. The above is the roller pressurizing step.

In the above described laser irradiation step and the roller pressurizing step, the galvanized steel sheets are respectively fed from the pair of uncoilers 11, 12 at high speed, so that the galvanized steel sheets are joined together.

Then, the pair of uncoilers 11, 12 respectively feed the galvanized steel sheets, so that the two galvanized steel sheets having been joined together in the roller pressurizing step are fed to the shear cutting machine 40. The shear cutting machine 40 cuts off the joined two galvanized steel sheets with shearing forces caused by the upper blade 41 and the lower blade 42 of the shear cutting machine 40. Then, the pieces of the joined two galvanized steel sheets having been cut off by the shear cutting machine 40 are fed to the stack table 50 to be stacked on the stack table 50.

The present embodiment exerts the following effects. The laser joining method for galvanized steel sheets includes: a laser irradiation step in which mating surfaces A of galvanized steel sheets (sheet members P) are subjected to laser irradiation such that the mating surfaces A of the galvanized steel sheets are melted, the galvanized steel sheets respectively having surfaces coated with zinc; and a roller pressurizing step in which the galvanized steel sheets are pressurized by rollers 21, 22 to be joined together. The laser irradiation step includes: removing zinc plating layers PL respectively disposed on the surfaces of the galvanized steel sheets by the laser irradiation; and melting the surfaces of the galvanized steel sheets from which the zinc plating layers PL have been removed (steel members PB). The roller pressurizing step includes pressurizing the galvanized steel sheets by the rollers 21, 22 while the surfaces of the galvanized steel sheets that have been melted (molten steel members M) are in contact with each other such that the galvanized steel sheets are joined together.

With this configuration, the zinc plating layers PL are vaporized by the laser irradiation and the galvanized steel sheets are joined together while letting the vaporized zinc escape from the galvanized steel sheets, whereby the occurrence of blowholes can be suppressed. In addition, since only portions necessary for the joining are melted, the energy required for the laser irradiation for joining the galvanized steel sheets can be reduced. This eliminates the need for melting portions of the steel sheets unnecessary for the joining, which suppresses occurrence of a through hole penetrating the two stacked galvanized steel sheets in the stacking direction (a through hole formed by melting of the steel sheets).

In the laser irradiation step, a focal point F of a laser beam in the laser irradiation is set at a position directly in front of the position where the galvanized steel sheets are subjected to pressurizing. This configuration reliably suppresses occurrence of a blowhole, since the zinc plating layers PL are removed before the galvanized steel sheets are pressurized by the rollers 21, 22.

Specifically, portions of the galvanized steel sheets away from the mating surfaces A are irradiated with a peripheral part W of a laser beam with a low output power, and portions of the galvanized steel sheets at the mating surfaces A are irradiated with a center part S of the laser beam with a high output power.

Since an output of the laser irradiation is lowered at the peripheral part W of the laser beam, only zinc plating layers PL, a boiling point of which is low, are widely removed, and the surfaces of the steel members PB, of which zinc plating layers have been removed, are melted by the center part S of the laser beam with a high output power. In other words, the zinc plating layers PL on the galvanized steel sheets are removed from the first region R1 by the peripheral part W of the laser beam with a low output power in the laser irradiation, and then the first region R1 is moved to the center part S of the laser beam with a high output power, thereby enabling the center part S of the laser beam with a high output power to melt the steel members PB of the galvanized steel sheets in the second region R2 which is disposed in the first region R1 and is smaller than the first region R1. Accordingly, the zinc plating layers PL are widely removed, and the occurrence of blowholes can be more reliably suppressed.

The roller pressurizing step further includes covering the first region R1 with the steel members M of the galvanized steel sheets having been melted by the laser irradiation. Accordingly, the steel members M fill the space generated between the two galvanized steel sheets by removing the zinc plating layers PL, thereby enhancing bonding strength. In addition, intrusion of water, dust, and the like can be prevented by filling the space.

Figure 4:
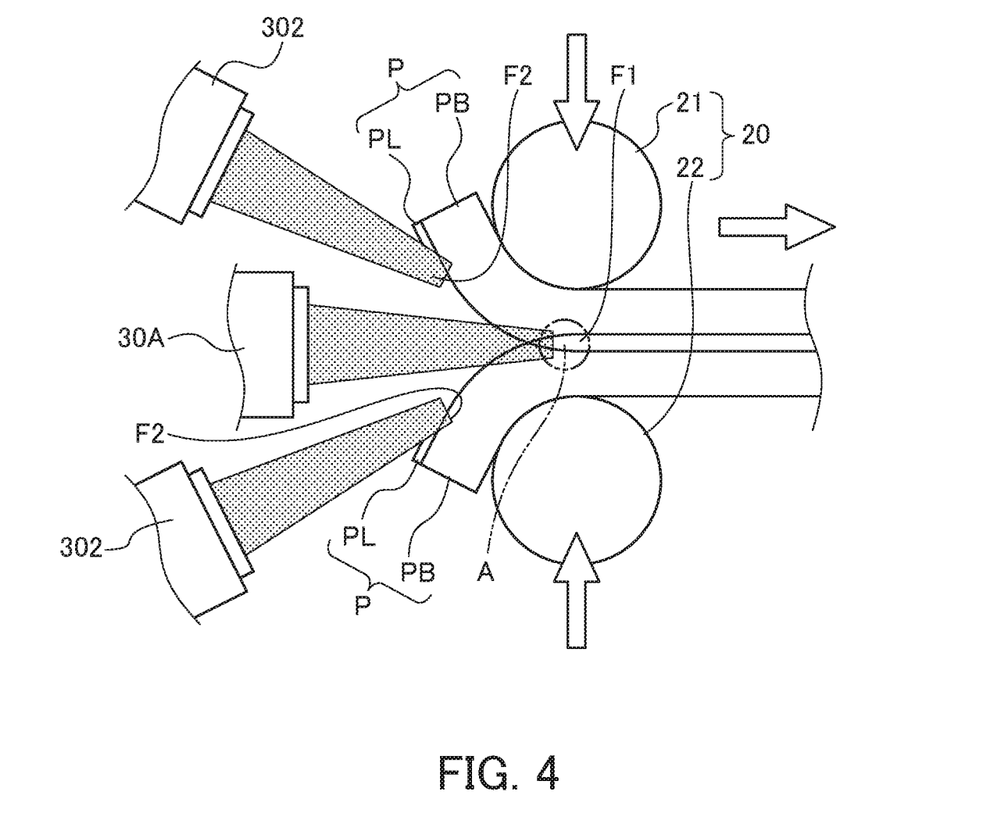
FIG. 4 schematically shows a state in which mating surfaces are irradiated with a laser beam in a laser irradiation step of the laser joining method for galvanized steel sheets according to a second embodiment of the present invention.

A second embodiment of the present invention will be described in detail with reference to the drawings. In the following description, the same components as those of the first embodiment will be given the same reference numerals, and a detailed description thereof will be omitted. A laser joining device that performs a laser joining method for galvanized steel sheets according to the present embodiment includes three laser emitting units 30, i.e., one laser emitting unit 30 for melting, two laser emitting units 302 for removing plating layers, which is different to the laser joining device 1 according to the first embodiment. FIG. 4 schematically shows a state in which mating surfaces A are irradiated with a laser beam in a laser irradiation step of a laser joining method for galvanized steel sheets according to the second embodiment of the present invention.

A laser emitting unit 30 identical to the laser emitting unit 30 according to the first embodiment is used as a laser emitting unit 30 for melting, but in a laser irradiation step, a focal point F1 of a laser beam in the laser irradiation performed by the laser emitting unit 30 is set at a position where the galvanized steel sheets are subjected to pressurizing, i.e., at the position of the mating surfaces A, instead of a position directly in front of the position where the galvanized steel sheets are subjected to pressurizing. A laser emitting unit the laser beam of which has an output power lower than that of the laser emitting unit 30 according to the first embodiment is employed as each of the laser emitting units 302 for removing plating layers. A focal point F2 of a laser beam in the laser irradiation performed by each of the laser emitting units 302 for removing plating layers is set at a position upstream of the position where the galvanized steel sheets are subjected to pressurizing (the position of the mating surfaces A) in the feeding direction of the galvanized steel sheets (sheet members P).

With the above configuration, the laser irradiation by the laser emitting units 302 for removing plating layers removes the zinc plating layers PL at a partial region of the galvanized steel sheets, and the laser irradiation by the laser emitting unit 30 for melting melts a part of the partial region of the steel sheets from which zinc plating layers PL have been removed (steel members PB).

Figure 5:
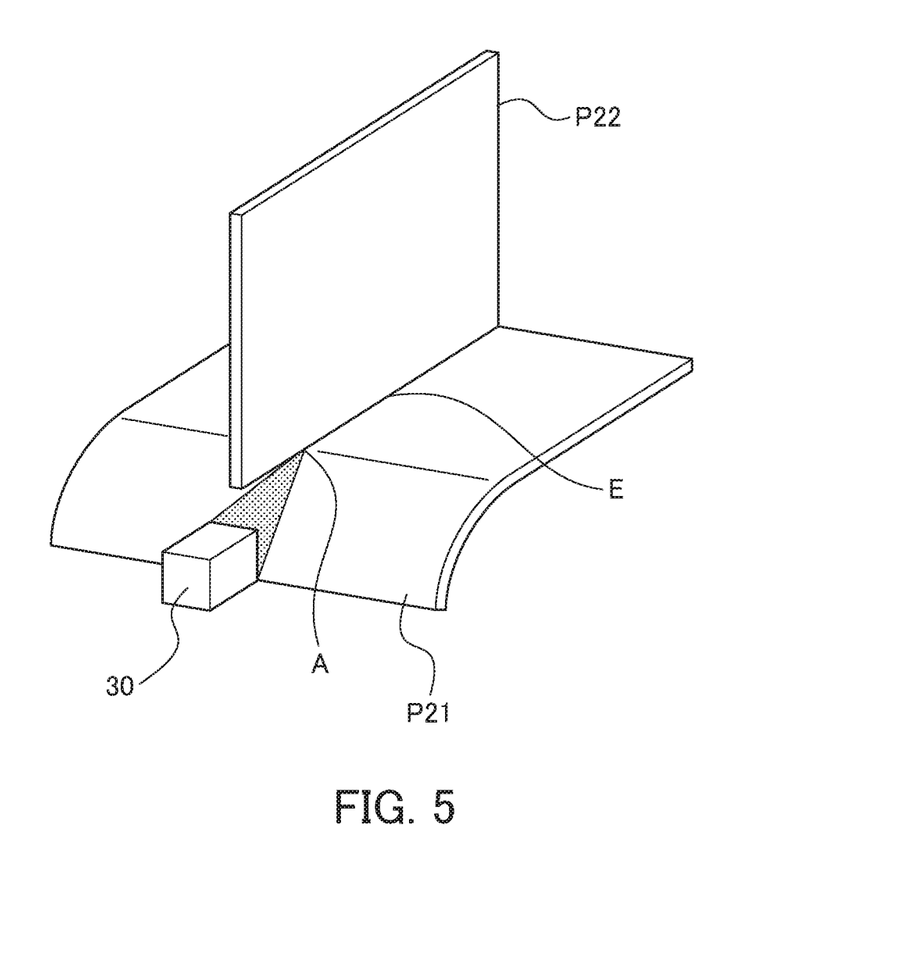
FIG. 5 schematically shows a state in which mating surfaces of galvanized steel sheets arranged in a T-shape are irradiated with a laser beam in a laser irradiation step of the laser joining method for galvanized steel sheets according to a third embodiment of the present invention.

Then, a third embodiment of the present invention will be described with reference to the drawings. In the following description, the same components as those of the first embodiment will be given the same reference numerals, and a detailed description thereof will be omitted. In the laser joining method for galvanized steel sheets according to the first embodiment, the lower surface of one of the galvanized steel sheets and the upper surface of the other one of the galvanized steel sheets are disposed to face each other so that the lower surface and the upper surface form the mating surfaces A, but the configuration of the mating surfaces A according to the present embodiment is different to the above configuration, which is different from the laser joining method for galvanized steel sheets according to the first embodiment. FIG. 5 schematically shows the state in which the mating surfaces of galvanized steel sheets arranged in a T-shape are irradiated with a laser beam in a laser irradiation step of the laser joining method for galvanized steel sheets according to the third embodiment of the present invention.

According to the present embodiment, a surface of one of the galvanized steel sheets (first sheet member P21) and a surface (end surface) of an edge part E of the other one of the galvanized steel sheets (second sheet member P22) are brought into contact with each other to form mating surfaces A, and are joined together by laser irradiation. This allows the two galvanized steel sheets to be joined together in a T-shape.

The present invention is not limited to the above embodiments, and modifications, improvements, and the like can be made within the range that can achieve the object of the present invention. For example, the galvanized steel sheets having the same thickness are joined together in the present embodiment, but the configuration is not limited thereto. The galvanized steel sheets having a difference in thickness may be joined together, for example. With this configuration, the galvanized steel sheets having different thicknesses can be joined together. Different materials may be combined, for example, a galvanized aluminum sheet and a galvanized iron sheet may be joined together. An aluminum sheet may be joined to another aluminum sheet. Although the present embodiment employs the galvanized steel sheets which are the coil members C respectively fed from the pair of uncoilers 11, 12 as the sheet members P, the galvanized steel sheets are not limited to the coil members from the uncoilers. For example, cut plates may be employed instead of the coil members from the uncoilers, and the cut plates may be joined together.

The laser irradiation step and the roller pressurizing step in the laser joining method are not limited to the configuration of the laser irradiation step and the roller pressurizing step according to the present embodiment, and the laser joining device that performs the laser joining method is not limited to the laser joining device 1 according to the present embodiment. For example, the pressure roller 20 used in the roller pressurizing step is not limited to the configuration of the pressure roller 20 according to the present embodiment. For example, the diameter of the roller may be changed as required. As described above, according to the present embodiment, one of the galvanized steel sheets (sheet members P) fed from the uncoiler 11 is introduced between the rollers 21, 22 along the peripheral surface of the upper roller 21, and the other one of the galvanized steel sheets (sheet members P) fed from the uncoiler 12 is introduced between the rollers 21, 22 along the peripheral surface of the lower roller 22. Accordingly, the distance between the two galvanized steel sheets (sheet members P) extending along the peripheral surfaces of the pair of the rollers can be changed by changing the radii of the rollers. With this configuration, rollers having appropriate diameters can be used, for example, in the case where a greater amount of laser irradiation is required as the zinc plating layers PL are thick or the like, or on the contrary, in the case where a smaller amount of laser irradiation is required as the zinc plating layers PL are thin or the like. A pair of rollers 21, 22 are used as the pressure roller 20, but are not limited thereto.

According to the present embodiment, a laser joining method for the galvanized steel sheets is implemented to fabricate inner panels of vehicle doors, but is not limited thereto. For example, the method may be implemented to manufacture housing materials.

EXPLANATION OF REFERENCE NUMERALS

20 pressure roller (roller)
A mating surface
E edge part
F focal point
M molten steel members
PL zinc plating layer
P sheet member (galvanized steel sheet)
R1 first region
R2 second region
S center part
W peripheral part

What is claimed is:

1. A laser joining method for joining galvanized steel sheets, said method comprising:
   a laser irradiation step in which mating surfaces of the galvanized steel sheets are subjected to a laser irradiation such that the mating surfaces of the galvanized steel sheets are melted, the galvanized steel sheets respectively having zinc-coated surfaces; and
   a roller pressurizing step in which the galvanized steel sheets are pressurized by a roller to join the sheets together, wherein:
   the laser irradiation step includes: removing zinc from the zinc-coated surfaces of the galvanized steel sheets by the laser irradiation; and melting the surfaces of the galvanized steel sheets from which the zinc has been removed,
   the roller pressurizing step includes pressurizing the galvanized steel sheets by the roller while the surfaces of the galvanized steel sheets that have been melted are in contact with each other such that the galvanized steel sheets are joined together, and
   in the laser irradiation step, a focal point of a laser beam in the laser irradiation is set at a focal position upstream of an outer edge of the roller in a feeding direction of the galvanized steel sheets, the focal position being directly in front of a position where the galvanized steel sheets are subjected to pressurizing.

2. The laser joining method for galvanized steel sheets according to claim 1, wherein, in the laser irradiation step, the zinc is removed from a first region on the galvanized steel sheets by the laser irradiation, and then steel members of the galvanized steel sheets in a second region are melted by the laser irradiation, the second region being disposed in the first region and being smaller than the first region.

3. The laser joining method for galvanized steel sheets according to claim 2, wherein the roller pressurizing step further includes covering the first region with portions of the steel members of the galvanized steel sheets in the second region having been melted by the laser irradiation.

4. The laser joining method for galvanized steel sheets according to claim 1, wherein in the laser irradiation step, an output of the laser irradiation is increased at a center part of a laser beam and lowered at a peripheral part of the laser beam.

5. The laser joining method for galvanized steel sheets according to claim 1, wherein the galvanized steel sheets having a difference in thickness are joined together.

6. The laser joining method for galvanized steel sheets according to claim 1, wherein an edge part of a first one of the galvanized steel sheets is joined to a surface of a second one of the galvanized steel sheets.

* * * * *